Jan. 30, 1945. G. A. LYON 2,368,237
WHEEL COVER STRUCTURE AND ASSEMBLY
Original Filed Jan. 20, 1940
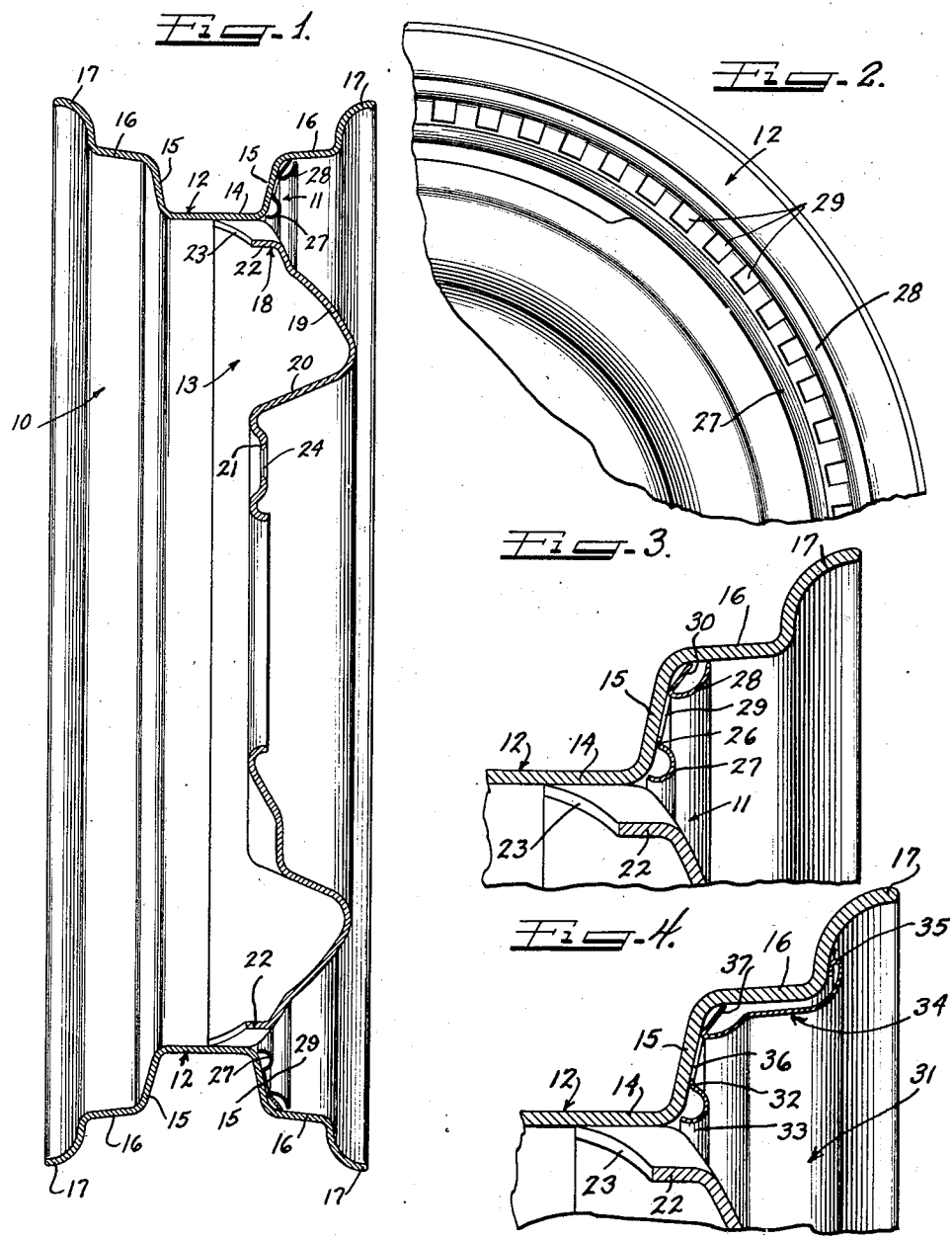
Inventor
GEORGE ALBERT LYON.

Patented Jan. 30, 1945

2,368,237

UNITED STATES PATENT OFFICE 2,368,237

WHEEL COVER STRUCTURE AND ASSEMBLY

George Albert Lyon, Allenhurst, N. J.

Original application January 20, 1940, Serial No. 314,819, Patent No. 2,312,568, dated March 2, 1943, now Reissue No. 22,428, dated February 1, 1944. Divided and this application July 2, 1942, Serial No. 449,394

5 Claims. (Cl. 41—10)

This invention relates to a wheel cover structure and assembly, and more particularly to a novel wheel member or wheel cover which cooperates with a vehicle wheel in a novel manner and which has an annular series of openings therein through which a portion of the wheel may be seen.

This application is a division of my copending application, Serial No. 314,819, filed January 20, 1940, issued as Patent No. 2,312,568, dated March 2, 1943, and reissued as Re. 22,428 on February 1, 1944, which is a continuation in part of my application for United States Letters Patent, Serial No. 80,395, filed May 18, 1936, upon which United States Letters Patent 2,231,930, issued on February 18, 1941.

The wheel cover structure or cover member may be in the form of a wheel disk or a trim ring. The wheel disk may either be in the form of an enlarged hub cap or it may be in the form of an annulus which partially covers the front face of a wheel.

The majority of vehicle wheels of today are equipped with ornamental wheel members or covers which extend over a portion of their outer surfaces. These wheel members or covers are usually provided with a highly polished exterior surface. It has been found desirable in certain instances to provide wheel cover structures or members having openings therein through which a portion of the wheel may be seen. It is an object of the present invention to provide a novel structure of this character which cooperates with and which is secured to the wheel in a novel manner.

Another object of the present invention is to provide a novel wheel cover structure or member having an annular series of openings therein formed by striking out an annular series of tangs from the member which tangs are bent back to form an attaching means for securing the member to the wheel.

A further object of the present invention is to provide a novel wheel member formed of relatively thin sheet material for disposition on one face of a wheel which is economical to manufacture which may be readily and quickly assembled on the wheel in substantially permanent engagement therewith and which is rugged and reliable in use.

A still further object of the present invention is to provide a novel wheel cover structure or member having an annular portion thereof lying in intimate contact with a face of a wheel on which the member is mounted, and which portion is provided with an annular series of openings through which the wheel may be seen.

A further object of this invention resides in the provision of a wheel cover member or disk wherein the openings in the member are formed by striking toothlike elements from the member for biting engagement with the wheel to hold the member thereon.

Many other objects and advantages of my invention will become apparent from the following description and accompanying drawing, in which:

Figure 1 is a vertical sectional view of a vehicle wheel and cover assembly;

Figure 2 is a fragmentary front view of a portion of the wheel and wheel cover assembly;

Figure 3 is an enlarged fragmentary sectional view showing the upper portion of the wheel and wheel cover assembly in Figure 1;

Figure 4 is a fragmentary sectional view similar to Figure 3 showing a modified form of the present invention.

Referring now to the embodiment of the present invention which is illustrated in Figures 1, 2 and 3, there is shown a wheel assembly comprising a vehicle wheel 10 and a wheel cover or trim ring 11. The wheel 10 comprises a rim part 12 and a body part 13. The rim 12 is of the usual drop center type and includes a base flange 14, opposite intermediate side flanges 15, opposite intermediate base flanges 16, and opposite edge portions 17. The drop center rim 12 as illustrated is of the type commonly employed in the automotive vehicle art of the present day, and, as is well known to those skilled in the art, is arranged to receive and accommodate a pneumatic tire (not shown).

The body part 13 and wheel 10 includes, in general, a rearwardly extending outer flange 18, an outer web portion 19, a generally axially rearwardly and slightly radially inwardly extending inner web portion 20, and a radially inwardly extending wheel mounting flange 21. The rearwardly extending outer flange 18 is secured to the underside of the base flange 14 of the rim 12 in any suitable manner, such as by welding or riveting (not shown). The circumferentially spaced portions of the flange 18 are depressed radially inwardly as at 22 to permit circulation of air through the wheel. The rear edges 23 of the depressed portion 22 are cut back as is clearly shown in Figure 1 of the drawing.

The wheel mounting flange 21 is provided with an annular series of apertures 24 for the reception of the usual wheel mounting bolts (not shown), which bolts are arranged to extend there-through and to engagement with the hub portion or brake drum of the vehicle (not shown).

The wheel cover or trim ring 11 includes a principal body portion 26 which is seated on and lies in intimate contact with the intermediate side flange 15 of the rim 12 and inner and outer beaded marginal portions 27 and 28 respectively. The principal body portion 26 has an annular series of apertures 29 (see Figure 2) formed therein by striking out tangs 30. These tangs or toothlike projections 30 are bent to extend obliquely radially outwardly and axially forwardly of the wheel and in such a position are disposed behind the outer beaded portion 28 as is clearly shown in Figures 1 and 3.

The tangs or toothlike projections 30 are of such length that when the trim ring 11 is forced onto the wheel 10, the tangs or toothlike projections 30 make a biting engagement with the intermediate base flange 16 of the rim 12. An examination of Figure 3 will show that any tendency for the trim ring 11 to become dislodged from the wheel 10 will only cause the tangs or finger-like projections 30 to bite more deeply into the metal in the rim 12. It will thus be understood that the trim ring 11 is ruggedly mounted on and secured to the wheel 10 for it is only by rupturing or partially rupturing or bending the fingers or tangs 30 that the trim ring 11 may be removed from the wheel 10 after it has once been mounted thereon.

It will further be observed that the annular series of openings 29 in the trim ring 11 permit portions of the front face of the wheel to be seen. This provides a very striking ornamental appearance since the trim ring 11 may be given a highly polished exterior finish and the intermediate flange 15 of the rim 12 may be enamelled any suitable color which provides a striking contrast to the highly polished exterior surface of the trim ring 11 when viewed through the openings 29. The trim 11 may of course be enamelled or otherwise painted and the portion of the wheel surface which is exposed through the openings 29 may be highly polished instead or both the trim ring 11 and the wheel 10 may be painted or enamelled.

In Figure 4 of the drawing I have illustrated a modification of the trim ring shown in Figures 1 to 3. More particularly, a trim ring 31 is provided having a principal body portion 32 which is seated on and lies in intimate contact with the intermediate side flange 15 of the rim 12. The trim ring 31 also includes an inner beaded portion 33 and an outer extended marginal portion 34. This extended marginal portion 34, instead of being a simple bead as is shown in Figures 1 to 3, is arranged to extend radially inwardly of the intermediate base flange 16 of the rim 12 and around the outer corner thereof into engagement with the outer edge portion 17 of the rim 12. The radial outer edge of the marginal portion 34 of the trim ring 31 is inturned as at 35.

The principal body portion 32 of the trim ring 31 is provided with an annular series of apertures 36 which will form by striking out tangs 37. These tangs or toothlike projections are bent around to extend obliquely radially outwardly and axially forwardly of the wheel and are of such length that when the trim ring 31 is mounted on the wheel 10 the tangs or finger-like projections 37 extend into biting engagement with the intermediate base flange 16 of the rim 12.

From the foregoing it will be seen that the presence of beads 27, 28, 33 and 34 imparts a degree of rigidity to the trim ring which effectively supports the same against buckling during handling and use.

It is to be understood that the embodiments as shown herein are for illustrative purposes and may be changed or modified without departing from the spirit and scope of the invention, as set forth in the appended claims.

What I claim is:

1. In a vehicle wheel and ornamental member assembly, the combination comprising a wheel having a multi-flange rim and body parts and a trim ring mounted on said rim part, said trim ring including an annular portion seated on and lying in intimate contact with one face of said rim part and a marginal portion of arcuate cross-section extending over the edge portion of said rim, said annular portion of said trim ring having a plurality of attaching fingers struck therefrom and bent back to extend obliquely, axially, forwardly behind said marginal portion and into biting engagement with said wheel, said trim ring having an annular series of apertures therein where said attaching fingers have been struck therefrom through which portions of said wheel may be seen.

2. A sheet metal ornamental member for disposition on the outer face of a wheel having a multi-flange tire rim and a central load bearing portion, said member comprising an annulus, and having inner and outer peripheral margins thereof formed to provide outwardly convex beads one of which is constructed to overlie the outer surface of the edge portion of the multi-flange tire rim of a wheel over which it is disposed and an intermediate portion disposed between the adjacent edges of said beads, said intermediate portion being seated on and lying in intimate contact with one face of said wheel, and having a plurality of attaching fingers struck therefrom and bent back to extend obliquely, axially, forwardly behind said ornamental member and into biting engagement with the wheel, said intermediate portion having an annular series of apertures therein where said attaching fingers have been struck therefrom, through which portions of said wheel may be seen.

3. An annular sheet metal ornamental member for disposition on the outer face of a wheel having a multi-flange tire rim, said member having the inner and outer peripheral margins formed to provide outwardly disposed convex beads, one of which is constructed to overlie the edge portion of the rim of a wheel over which it is disposed and having an annular intermediate portion seated on and lying in intimate contact with a portion of the wheel, said intermediate portion having an annular series of wheel attaching fingers struck therefrom and bent back behind said member to provide an annular series of openings in said member through which portions of the wheel may be seen, said fingers extending obliquely, axially, forwardly to provide biting engagement with said wheel for assembly purposes.

4. In a vehicle wheel and ornamental assembly comprising a wheel having rim and body parts and a trim ring mounted on said rim part, said rim part having an outer edge portion and intermediate base flanges, said trim ring comprising an annular member having its outer peripheral edge formed to lie in intimate contact with the outer surface of the edge portion of the rim, having a portion thereof inwardly of the outer edge formed arcuately to provide a cover for the outer surface of the intermediate base flange and having an outwardly convex portion disposed inwardly of said last named covering portion, a bead formed at the inner peripheral margin of said annular ornamental member, and an intermediate, annular flat portion formed between said last named bead and the outwardly convex portion, said intermediate portion having a plurality of attaching fingers struck therefrom and bent back to extend obliquely, axially, forwardly behind said convex portion and into biting engagement with the outer surface of the intermediate base flange of the rim, said ornamental member having an annular series of apertures therein where said attaching fingers have been struck therefrom through which portions of said wheel may be seen.

5. In a vehicle wheel and ornamental member assembly, the combination comprising a wheel having a rim with edge portions for receiving the radially inner part of a tire therebetween and a central load bearing part, a trim ring mounted on said rim, said trim ring including an annular portion overlying one face of the wheel and a marginal portion of arcuate cross-section extending over an edge portion of said rim, one of said portions of the trim ring having a plurality of attaching elements struck therefrom and bent back rearwardly behind the trim ring and into retaining engagement with said wheel, said trim ring having an annular series of apertures therein where said attaching elements have been struck therefrom through which portions of the wheel may be seen.

GEORGE ALBERT LYON.